United States Patent [19]

Irite et al.

[11] Patent Number: 5,744,112
[45] Date of Patent: Apr. 28, 1998

[54] METHOD FOR CLEANING EXHAUST GAS

[75] Inventors: Naoko Irite; Akira Abe; Kiyohide Yoshida, all of Kumagaya, Japan

[73] Assignee: Kabushiki Kaisha Riken, Tokyo, Japan

[21] Appl. No.: 647,259

[22] Filed: May 13, 1996

Related U.S. Application Data

[63] Continuation of Ser. No. 378,258, Jan. 26, 1995, abandoned.

[30] Foreign Application Priority Data

| Feb. 10, 1994 | [JP] | Japan | 6-037860 |
| Feb. 10, 1994 | [JP] | Japan | 6-037876 |
| Apr. 6, 1994 | [JP] | Japan | 6-092949 |
| Apr. 6, 1994 | [JP] | Japan | 6-092962 |
| May 24, 1994 | [JP] | Japan | 6-133586 |
| May 24, 1994 | [JP] | Japan | 6-133602 |
| Dec. 5, 1994 | [JP] | Japan | 6-329949 |
| Dec. 5, 1994 | [JP] | Japan | 6-330018 |

[51] Int. Cl.$^6$ .................................. C01C 3/00
[52] U.S. Cl. .............. 423/236; 423/213.5; 423/235
[58] Field of Search .............. 423/239.1, 240 S, 423/245.3, 247, 239.2, 213.5, 244.02, 235, 244.11, 244.1, 236, 244.09, 245.1; 502/347, 313, 317, 321, 324, 326, 330, 339, 353

[56] References Cited

U.S. PATENT DOCUMENTS

| 3,956,188 | 5/1976 | Hindin et al. | 252/465 |
| 5,075,274 | 12/1991 | Kiyohide et al. | 502/303 |
| 5,208,202 | 5/1993 | Muramatsu et al. | 502/302 |
| 5,227,145 | 7/1993 | Kintaichi et al. | 423/239 |
| 5,260,043 | 11/1993 | Li et al. | 423/239.2 |
| 5,318,760 | 6/1994 | Subramanian et al. | 423/239.2 |
| 5,320,999 | 6/1994 | Muramatsu et al. | 502/303 |
| 5,384,110 | 1/1995 | Muramatsu et al. | 423/239.1 |

FOREIGN PATENT DOCUMENTS

| 0286967 | 4/1988 | European Pat. Off. |
| 0362960 | 4/1990 | European Pat. Off. |
| 0459396 | 12/1991 | European Pat. Off. |
| 0577438 A2 | 1/1994 | European Pat. Off. |
| 4128629 A1 | 3/1993 | Germany |
| 63-10091 | 5/1988 | Japan |
| 63-28372 | 11/1988 | Japan |
| 1130735 | 5/1989 | Japan |

OTHER PUBLICATIONS

English Abstract of JP05115788A from Derwent, May 14, 1993.
English Abstract of JP04298235A from Derwent, Jan. 22, 1992.
English Abstract of EP0577438A3 and Search Report for EP0577438A3, Jan. 5, 1994.
Keenan et al., "General College Chemistry", 5th Edition, 1976, p. 489.
Catalyst, Selective Catalytic Reduction . . . Hydrocarbons, vol. 33, No. 2, p. 59, 1991.
Thesis, Selective Reduction of Nitrogen Oxide by Hydrocarbons, The 60th Fall Conference of the Japan Chemical Society, No. 3L423, 1990.

(List continued on next page.)

*Primary Examiner*—David A. Simmons
*Assistant Examiner*—Linda L. Gray
*Attorney, Agent, or Firm*—Browdy and Neimark

[57] ABSTRACT

A method of cleaning an exhaust gas using an exhaust gas cleaner constituted by a first catalyst comprising a first porous inorganic oxide supporting an Ag component, a W component and a Pt component and optionally a second catalyst comprising a second porous inorganic oxide supporting a Pt component alone or in combination with a W component. The Ag component may include Ag and compounds thereof, the Pt component of the first and second catalysts may include Pt, Pd, Ru, Rh, Ir and Au, and the W component of the first and second catalysts may include W, V, Mn, Mo, Nb and Ta. The W component effectively catalyze the reduction of nitrogen oxides by ammonia to enhance the removal efficiency of the exhaust gas cleaner.

3 Claims, 1 Drawing Sheet

OTHER PUBLICATIONS

Thesis, Selective Reduction of Nitrogen Oxide by Hydrocarbons (1) Investigation of Zeolite Catalysts. The 60th Fall Conference of the Japan Chemical Society, No. 3L422, 1990.

Thesis, Development of Catalytic Removal Method of Nitrogen Oxide in Presence of $SO_x$. The 60th Fall Conference of the Japan Chemical Society, No. 3L420, 1990.

Thesis, Catalytic Crackingf of Nitrogen Oxide Over Copper Zeolite. The 59th Spring Conference of the Japan Chemical Society, No. 2A526, 1990.

METHOD FOR CLEANING EXHAUST GAS

This application is a continuation of application Ser. No. 08/378,258, filed Jan. 26, 1995, now abandoned.

BACKGROUND OF THE INVENTION

The present invention relates to an exhaust gas cleaner for effectively removing nitrogen oxides by reduction from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" (NOx) means nitrogen monoxide and/or nitrogen dioxide.

The nitrogen oxides are one of causes of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced (a selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen or carbon monoxide. However, this method requires a larger amount of the reducing agent than its stoichiometric amount relative to oxygen in the exhaust gas to carry out effective removal of NOx. Accordingly, this method is effective only for the exhaust gas having a relatively low oxygen concentration, which is generated by burning nearly at a theoretical air-fuel ratio.

There have been proposed methods of reducing nitrogen oxides by adding to an exhaust gas a reducing agent in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 60th Fall Conference of the Japan Chemical Society; and "Catalyst", Vol. 33, No. 2, p.59 (1991)).

However, these methods are effective only in a narrow temperature range of NOx removal. Also, their efficiency of removing nitrogen oxides is extremely low in the case of an actual exhaust gas because it contains about 10% of moisture. The inventor has proposed that an exhaust gas cleaner comprising an Ag catalyst at inlet side thereof and a Pt catalyst at outlet side thereof can effectively remove nitrogen oxides together with carbon monoxide and hydrocarbons even when the exhaust gas contains 10% moisture (European Patent Application No. 93305235.9, U.S. patent application Ser. No. 08/084,983). However, the exhaust gas cleaner is still insufficient in the NOx removal at a temperature range lower than 400° C.

OBJECT AND SUMMARY OF THE INVENTION

Accordingly, an object of the present invention is to provide an exhaust gas cleaner and a method capable of efficiently removing nitrogen oxides by reduction together with residual or unburned components such as carbon monoxide and hydrocarbons by oxidation from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

As a result of intense research in view of the above objects, the inventors have found that nitrogen oxides are reduced to nitrogen gas accompanied by by-production of ammonia when an organic compound such as ethanol is allowed to react with an exhaust gas containing oxygen and nitrogen oxides over a catalyst comprising a porous inorganic oxide supporting an Ag component such as Ag and compounds thereof, a W component such as W, V, Mn, etc. and a Pt component such as Pt, Pd, Ru, etc. The inventors have further found that nitrogen oxides can be removed more effectively in a wide temperature range from an exhaust gas containing about 10% of moisture when the exhaust gas, after introducing thereinto at least one reducing agent of hydrocarbons and oxygen-containing organic compounds having at least two carbon atoms or a fuel containing the reducing agent, is brought into contact at a specified temperature and space velocity with a combined catalyst system of such a catalyst as mentioned above and a catalyst supporting a Pt component such as Pt, Pd, Ru, etc. and optionally a W component such as W, V, Mn, etc., both the Pt component and W component being capable of reducing nitrogen oxides by the aid of ammonia as a reducing agent. The present invention has been completed based on these findings.

Thus, in an aspect of the present invention, there is provided an exhaust gas cleaner for removing nitrogen oxides by reduction and unburned components of carbon monoxide and hydrocarbons by oxidation from an exhaust gas containing nitrogen oxides and oxygen in an amount larger than its stoichiometric amount relative to the unburned components in the exhaust gas, wherein the exhaust gas cleaner is constituted by (1) a first catalyst comprising a first porous inorganic oxide supporting (a) 0.2–15 weight % of an Ag component, (b) 0.01–10 weight % of a W component and (c) 1 weight % or less of a Pt component and optionally (2) a second catalyst comprising a second porous inorganic oxide supporting (d) 5 weight % or less of a Pt component alone or in combination with (e) 10 weight % or less of a W component, the weight percentages being expressed by metal basis, the Ag component consisting essentially of at least one of Ag and compounds thereof, the Pt component of the first and second catalysts consisting essentially of at least one of Pt, Pd, Ru, Rh, Ir and Au, and the W component of the first and second catalysts consisting essentially of at least one of W, V, Mn, Mo, Nb and Ta.

In another aspect of the present invention, there is provided a method for removing nitrogen oxides by reduction and unburned components of carbon monoxide and hydrocarbons by oxidation from an exhaust gas containing nitrogen oxides and oxygen in an amount larger than its stoichiometric amount relative to the unburned components in the exhaust gas, which comprises (1) disposing the exhaust gas cleaner as defined above in a flow path of the exhaust gas, (2) introducing into the exhaust gas at least one reducing agent of hydrocarbons and oxygen-containing organic compounds having at least two carbon atoms or a fuel containing at least one of the reducing agent on an upstream side of the exhaust gas cleaner, and (3) bringing the resulting exhaust gas containing the reducing agent into contact with the exhaust gas cleaner at 150°–650° C., thereby causing a reaction of the nitrogen oxides with the reducing agent to remove the nitrogen oxides by reduction and unburned components of carbon monoxide and hydrocarbons by oxidation from the exhaust gas.

DETAILED DESCRIPTION OF THE INVENTION

Figure 1:
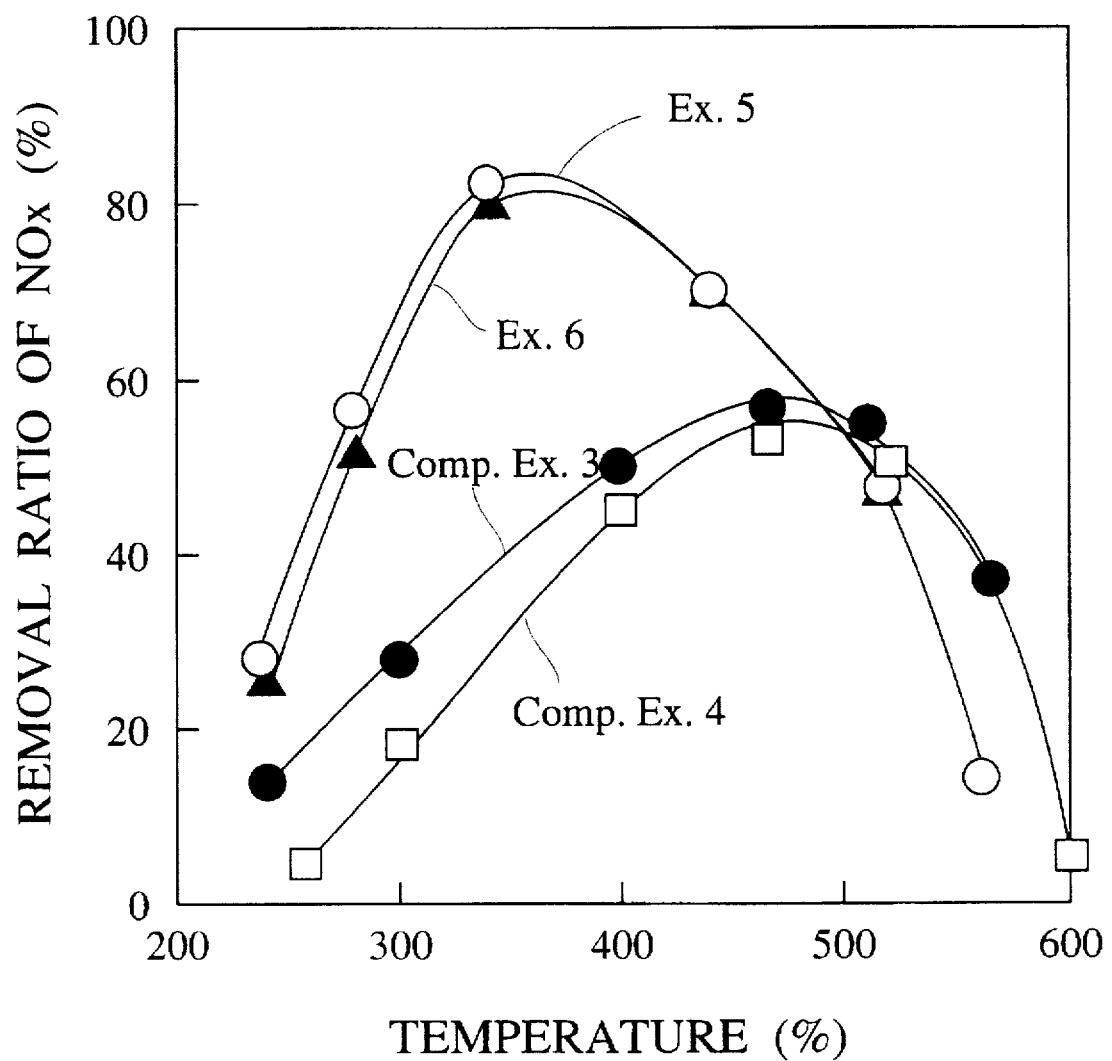
FIG. 1 is a graph showing the dependency of the removal ratio of NOx on the exhaust gas temperature in Examples 5 and 6 and Comparative Examples 3 and 4.

A first preferred exhaust gas cleaner of the present invention is constituted by a catalyst comprising a porous inorganic oxide supporting (a) 0.2–15 weight % of an Ag component consisting essentially of at least one of Ag and compounds thereof, (b) 0.01–10 weight % of a W component consisting essentially of at least one of W, V, Mn, Mo, Nb and Ta and (c) 1 weight % or less of a Pt component consisting essentially of at least one of Pt, Pd, Ru, Rh, Ir and Au. In the present specification and claims, the weight percentages of the catalytically active components are expressed by metal basis.

A second preferred exhaust gas cleaner of the present invention is constituted by (1) a first catalyst comprising a first porous inorganic oxide supporting (a) 0.2–15 weight % of an Ag component consisting essentially of at least one of Ag and compounds thereof, (b) 0.01–10 weight % of a W component consisting essentially of at least one of W, V, Mn and Mo and (c) 1 weight % or less of a Pt component consisting essentially of at least one of Pt, Pd, Ru, Rh, Ir and Au, and (2) a second catalyst comprising a second porous inorganic oxide supporting (d) 5 weight % or less of a Pt component consisting essentially of at least one of Pt, Pd, Ru, Rh, Ir and Au.

A third preferred exhaust gas cleaner of the present invention is constituted by (1) a first catalyst comprising a first porous inorganic oxide supporting (a) 0.2–15 weight % of an Ag component consisting essentially of at least one of Ag and compounds thereof, (b) 5 weight % or less of a W component consisting essentially of at least one of W, V, Mn, Mo, Nb and Ta and (c) 1 weight % or less of a Pt component consisting essentially of at least one of Pt, Pd, Ru, Rh, Ir and Au, and (2) a second catalyst comprising a second porous inorganic oxide supporting (d) 5 weight % or less of a Pt component consisting essentially of at least one of Pt, Pd, Ru, Rh, Ir and Au and (e) 10 weight % or less of a W component consisting essentially of at least one of W, V, Mn, Mo, Nb and Ta.

The exhaust gas cleaner of the present invention may be basically in two forms.

The exhaust gas cleaner of a first preferred form is obtained by coating on a cleaner substrate the first and optional second catalyst each comprising a powdery porous inorganic oxide carrying one or more catalytically active components. The exhaust gas cleaner of such a form may be also obtained by carrying the catalytically active components onto a porous inorganic oxide powder coated on a cleaner substrate. Preferable materials for the cleaner substrate include porous, heat-resistant ceramics having a large specific surface area such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the cleaner substrate may be formed from a known metal material. The shape and size of the cleaner substrate may be changed depending on applications. Practically, the cleaner substrate may be fabricated from two parts or more such as an inlet portion, an intermediate portion, an outlet portion, etc. The cleaner substrate may be of a three-dimensional structure such as a honeycomb, a foam, a refractory fiber assembly, etc. Further, the cleaner substrate may be of granules or pellets. The first and optional second catalysts may be coated on different portions of one cleaner substrate. Alternatively, the first and optional second catalysts may be coated on separate cleaner substrates, and thereafter, fabricated into an exhaust gas cleaner.

The exhaust gas cleaner of a second preferred form may be produced by charging into a suitable reactor such as a catalytic converter, which is equipped with at least inlet and outlet portions, the first and optional second catalysts obtained by carrying one or more catalytically active components on a pelletized, granular or powdery porous inorganic oxide, or obtained by forming a porous inorganic oxide carrying one or more catalytically active components into pellet, granule or powder.

The exhaust gas cleaner of the present invention is constituted by the following first catalyst and optionally second catalyst.

[A] First catalyst

The first catalyst comprises a first porous inorganic oxide supporting an Ag component, a W component and a Pt component.

[A-1] First porous inorganic oxide

Preferable materials for the first porous inorganic oxide include porous ceramics such as alumina, silica, titania, zirconia and their composite oxides, etc. Particularly preferable materials are γ-alumina alone or alumina-based composite oxides containing at least one of silica, titania and zirconia. The alumina content in the alumina-based composite oxides is preferred to be 50 weight % or more. An alumina content lower than 50 weight % results in a deteriorated initial efficiency of nitrogen oxides removal. The γ-alumina and alumina-based composite oxides promote the reaction of the nitrogen oxides with the reducing agent such as hydrocarbons and oxygen-containing organic compound or a fuel containing the reducing agent. In particular, the alumina-based composite oxides can improve the durability and heat resistance of the exhaust gas cleaner even in the presence of $SO_2$ gas, and further, prevent the oxidation of $SO_2$.

Specific surface area of the first porous inorganic oxide are preferably 10 $m^2$/g or more, and more preferably 30 $m^2$/g or more. When the specific surface area is smaller than 10 $m^2$/g, the catalytically active component supported on the first porous inorganic oxide does not come into contact with the exhaust gas in a large contact area, failing to remove nitrogen oxides efficiently.

[A-2] Ag component

The Ag component is one or more of Ag and compounds thereof. The compounds of Ag include oxides, halides such as chlorides, etc. and sulfates of Ag. Preferred Ag component is one or more of Ag, Ag oxides and Ag chlorides.

The average diameter, determined arithmetically, of the Ag component supported on the first porous inorganic oxide after calcination is preferably 10–10000 nm and more preferably 20–1000 nm. Generally the smaller the average diameter of the Ag component, the higher the activity of the first catalyst. However, when the average diameter of the Ag component is less than 10 nm, hydrocarbons and/or oxygen-containing organic compounds are likely to be predominantly oxidized, resulting in a decrease in the removal ratio of the nitrogen oxides. On the other hand, when the average diameter is larger than 10000 nm, the catalytic activity of the Ag component becomes low, resulting in a low removal ratio of the nitrogen oxides.

The amount of the Ag component supported on the first porous inorganic oxide is 0.2–15 weight %, preferably 0.5–12 weight % (on a metal basis) based on the first porous inorganic oxide. When the amount of the Ag component is less than 0.2 weight %, the removal ratio of the nitrogen oxides is low. On the other hand, when the amount of the Ag component is more than 15 weight %, the hydrocarbons and oxygen-containing organic compounds are likely to be predominantly burned, resulting in a decrease in the removal ratio of nitrogen oxides.

[A-3] W component

The W component is one or more of W, V, Mn, Mo, Nb and Ta, preferably one or more of W, V, Mo and Mn, and more preferably W and/or V. The W component may include oxides of such elements.

The amount of the W component supported on the first porous inorganic oxide is 0.01–10 weight %, preferably 0.01–8 weight % and more preferably 0.05–8 weight % (on a metal basis) based on the first porous inorganic oxide. The amount of the W component more than 10 weight % gives no additional effect in improving the removal ratio of the nitrogen oxides. The W component catalyzes the reduction of the nitrogen oxides by ammonia.

[A-4] Pt component

The Pt component is one or more of Pt, Pd, Ru, Rh, Ir and Au, preferably one or more of Pt, Pd, Ru, Rh and Au, and more preferably one or more of Pt, Pd and Au. The Pt component may include oxides of such elements.

The amount of the Pt component supported on the first porous inorganic oxide is up to 1 weight %, preferably 0.001–0.5 weight %, and more preferably 0.001–0.1 weight % (on a metal basis) based on the first porous inorganic oxide. The amount of the Pt component more than 1 weight % disadvantageously deteriorates the removal efficiency of the Ag component.

[A-5] Preparation of the first catalyst

The first catalyst is prepared by carrying on the first porous inorganic oxide the Ag component, the W component and the Pt component by known methods such as an impregnation method, a precipitation method, etc.

Of the Ag component, Ag may be carried by immersing a first porous inorganic oxide into an aqueous solution of silver nitrate, etc. When silver halide is to be carried, the first porous inorganic oxide impregnated with an aqueous solution of silver nitrate, etc. is further immersed in an aqueous solution of ammonium halide to convert the silver nitrate into silver halide precipitation. When silver sulfate is to be carried, the first porous inorganic oxide is immersed in a solution of silver sulfate in aqueous nitric acid.

The W component may be carried by immersing a first porous inorganic oxide into an aqueous solution of an ammonium tungstate, vanadate, molybdate, etc. in the presence of oxalic acid, etc.

The Pt component may be carried by immersing a first porous inorganic oxide into an aqueous solution of chloroplatinic acid, chloroauric acid, palladium chloride, etc.

The first porous inorganic oxide may be immersed in a mixed solution containing the Ag component, W component and Pt component. Alternatively, the first porous inorganic oxide may be successively immersed in respective solutions of the Ag component, W component and Pt component. The first porous inorganic oxide thus impregnated is dried at 50°–150° C., preferably at about 70° C. The dried material is then heated while elevating the temperature stepwise from 100° C. to 600° C. to be calcined in air, oxygen-containing atmosphere, nitrogen atmosphere or hydrogen stream. When the heating is conducted in a nitrogen atmosphere or in a hydrogen stream, it is preferable to finally conduct an oxidation treatment at 300°–650° C.

The first catalyst may be carried by the cleaner substrate as described above by known methods such as a washcoating method, a powder method, etc. The thickness of the first catalyst carried by the cleaner substrate is preferably up to 300 μm, though it is usually restricted by the difference in a thermal expansion coefficients between the first catalyst and the cleaner substrate. With this thickness, it is possible to prevent the cleaner from being broken by a thermal shock, etc. during NOx-removing operations.

The amount of the first catalyst coated onto a surface of the cleaner substrate is preferably 20–300 g/liter, more preferably 50–250 g/liter based on the cleaner substrate. When the amount of the first catalyst is less than 20 g/liter, a sufficient removal ratio of the nitrogen oxides cannot be achieved. On the other hand, an amount more than 300 g/liter gives no detectable increase in removal efficiency, but results in a higher loss of pressure.

[B] Second catalyst

The second catalyst may be used optionally and comprises a second porous inorganic oxide supporting a Pt component alone or in combination with a W component.

[B-1] Second porous inorganic oxide

The same materials for the first porous inorganic oxide may be used for the second porous inorganic oxide. Preferred materials include titania and composite oxides containing titania.

[B-2] Pt component

The Pt component may include the same elements as described in [A-4].

The amount of the Pt component supported on the second porous inorganic oxide is up to 5 weight %, preferably 0.01–4 weight % (on a metal basis) based on the second porous inorganic oxide. The amount of the Pt component more than 5 weight % disadvantageously deteriorates the removal efficiency of the Ag component. Known oxidation catalysts, alkaline earth elements, rare earth elements, etc. may be added to elongate the durability of the Pt component.

[B-3] W component

The W component may include the same elements as described in [A-3].

The amount of the W component supported on the second porous inorganic oxide is up to 10 weight %, preferably 0.01–10 weight %, more preferably 0.2–8 weight %, and particularly preferably 0.5–5 weight % (on a metal basis) based on the second porous inorganic oxide. The amount of the W component more than 10 weight % gives no additional effect in improving the removal ratio of the nitrogen oxides. The W component makes it possible to remove the nitrogen oxides by the reducing action of ammonia.

[B-4] Preparation of the second catalyst

The second catalyst is prepared by carrying on the second porous inorganic oxide the Pt component alone or in combination with the W component in the same manner as in the preparation of the first catalyst.

A weight ratio of the first catalyst to the second catalyst is 10:1 to 1:5, preferably 9:1 to 1:4. When the weight ratio is less than 1:5 (when the percentage of the first catalyst is too small), a sufficiently high removal ratio of the nitrogen oxides cannot be achieved in a wide temperature range of 150°–650° C. On the other hand, when the weight ratio is higher than 10:1 (when the percentage of the first catalyst is too large), the ammonia generated on the first catalyst is exhausted without reacting with the nitrogen oxides to increase the ammonia content in the exhaust gas.

With the exhaust gas cleaner described above, the nitrogen oxides in an exhaust gas containing about 10% of moisture can be effectively removed in a wide temperature range of 150°–650° C.

[C] Method for removing NOx

The exhaust gas cleaner is disposed in a flow path of the exhaust gas. In case of the exhaust gas cleaner comprising the first and second catalyst, the first catalyst and the second catalyst are disposed at the inlet side and the outlet side, respectively.

The exhaust gas usually contains residual hydrocarbons such as ethylene, propylene, etc. to some extent. Since the exhaust gas generally does not contain sufficient amounts of residual hydrocarbons to reduce all nitrogen oxides in the exhaust gas, at least one reducing agent should be introduced into the exhaust gas. A site for introducing the reducing agent is an upstream side of the exhaust gas cleaner.

The reducing agent includes hydrocarbons and oxygen-containing organic compounds having at least two carbon atoms. A fuel containing such reducing agent may be also used.

The hydrocarbons used as the reducing agent include alkanes, alkenes and alkynes which may be gaseous or liquid in the normal state (25° C., 1 atm). The gaseous hydrocarbons may be alkanes, alkenes or alkynes each having 2 or more carbon atoms, such as propane, propylene, acetylene, etc. The liquid hydrocarbons may be heptane, cetane, kerosene, diesel oil, light oil, gasoline, heavy oil, etc. The liquid hydrocarbons are preferred to have a boiling point of 50°–350° C.

The oxygen-containing organic compounds having at least two carbon atoms may be alcohols such as ethanol, isopropyl alcohol, etc.

The weight ratio of the reducing agent/nitrogen oxides is preferably 0.1–5. When the weight ratio is less than 0.1, the removal ratio of nitrogen oxides is low. On the other hand, when the weight ratio is more than 5, fuel efficiency is low.

The fuel to be introduced into the exhaust gas together with the reducing agent may be gasoline, light oil, kerosene, etc. The fuel containing the reducing agent may be introduced in an amount such that the weight ratio of the reducing agent/nitrogen oxides in the exhaust gas is 0.1–5.

To efficiently proceed, the reduction of the nitrogen oxides with the oxygen-containing organic compounds, hydrocarbons or ammonia, the overall apparent space velocity of the exhaust gas passing through the exhaust gas cleaner is 500,000 h$^{-1}$ or less, preferably 450,000 h$^{-1}$ or less, and more preferably 300,000 h$^{-1}$ or less. A overall apparent space velocity exceeding 500,000 h$^{-1}$ causes insufficient reduction of the nitrogen oxides to result in poor removal ratio of the nitrogen oxides.

The space velocity of the exhaust gas passing through the first catalyst is preferably 200,000 h$^{-1}$ or less, and more preferably 150,000 h$^{-1}$ or less. A space velocity at the first catalyst exceeding 200,000 h$^{-1}$ causes insufficient reduction of the nitrogen oxides to result in poor removal ratio of the nitrogen oxides.

The space velocity of the exhaust gas passing through the second catalyst is preferably 250,000 h$^{-1}$ or less, and more preferably 200,000 h$^{-1}$ or less. A space velocity at the second catalyst exceeding 250,000 h$^{-1}$ causes a poor removal by oxidation of hydrocarbons and carbon monoxide. When the exhaust gas contains $SO_2$, the space velocity at the second catalyst is preferred to be 10,000–250,000 h$^{-1}$, because $SO_2$ is likely to be preferentially oxidized when the space velocity is lower than 10,000 h$^{-1}$.

The contact time between the exhaust gas and the exhaust gas cleaner is preferably 0.006 g·sec/ml or more, and more preferably 0.007 g·sec/ml or more.

The exhaust gas passing through the exhaust gas cleaner where the reducing agent is reacted with the nitrogen oxides is kept at 150°–650° C., preferably 250°–600° C. When the temperature of the exhaust gas is lower than 150° C., a reduction of the nitrogen oxides by the reducing agent cannot be sufficiently carried out. On the other hand, when the temperature of the exhaust gas is higher than 650° C., the reducing agent is burned, failing to reduce the nitrogen oxides effectively.

The present invention will be described in further detail by way of the following Examples. Incidentally, the catalytic active components are generally expressed by metals themselves for simplicity in Examples. In the following Examples, the weight percentages of the catalytically active components are expressed by metal basis.

EXAMPLE 1

10 g of commercially available γ-alumina pellets (diameter: 1.5 mm, length: 2–3 mm, specific surface area: 260 m$^2$/g) were successively immersed in an aqueous solution of silver nitrate and an aqueous solution of palladium chloride to carry 4 weight % of Ag and 0.01 weight % of Pd based on the γ-alumina pellets. The resultant pellets were dried and heated to 600° C. stepwise in air to be calcined. The pellets thus calcined were further immersed in an aqueous solution prepared by heating a mixture of ammonium molybdate, oxalic acid and water to carry 0.06 weight % of Mo. The pellets thus treated were dried and calcined in the same manner as above to obtain a catalyst (Ag/Pd/Mo).

An exhaust gas cleaner was prepared by charging into a reactor pipe 3.6 g of the catalyst. Next, a test gas having the composition shown in Table 1 was caused to pass through the reactor pipe at a rate of 4.4 liters per minute (the normal state: 25° C., 1 atm), which corresponded to an overall apparent space velocity of about 30,000 h$^{-1}$. The temperature of the test gas in the reactor pipe was maintained at each temperature shown in Table 2 to cause a reaction of nitrogen oxides with ethanol.

TABLE 1

| Component | Concentration |
|---|---|
| Nitrogen monoxide | 800 ppm (dry basis) |
| Carbon dioxide | 10 volume % (dry basis) |
| Oxygen | 10 volume % (dry basis) |
| Ethanol | Three times the weight of nitrogen monoxide (dry baisis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The removal ratio was calculated from the equation: (initial concentration−concentration after passing)/(initial concentration)×100. The results are shown in Table 2.

EXAMPLE 2

In the same manner as in Example 1, γ-alumina powder (specific surface area: 200 m²/g) carrying 4 weight % of Ag, 0.01 weight % of Pd and 0.06 weight % of Mo was prepared. Then, 1.0 g of the catalyst thus obtained was coated on a commercially available honeycomb-type cordierite filter (diameter: 30 mm, length: 12.5 mm, 400 cells/in²), dried and then heated to 600° C. stepwise to be calcined to prepare an exhaust gas cleaner (Ag/Pd/Mo).

The exhaust gas cleaner was then charged in a reactor pipe. Then, the same tests as in Example 1 were conducted. The results are shown in Table 2.

COMPARATIVE EXAMPLE 1

In the same manner as in Example 1, a catalyst comprising γ-alumina pellets carrying 4 weight % of Ag only was prepared. 3.6 g of this catalyst was charged in a reactor pipe to obtain an exhaust gas cleaner. The same tests as in Example 1 were conducted on the exhaust gas cleaner thus obtained. The results are shown in Table 2.

TABLE 2

| Temp. (°C.) | Removal Ratio of Nitrogen Oxides (%) | | |
|---|---|---|---|
| | Ex. 1 | Ex. 2 | Com. Ex. 1 |
| 250 | 82.0 | 88.0 | 30.0 |
| 300 | 92.8 | 95.5 | 50.2 |
| 350 | 83.2 | 90.0 | 65.8 |
| 400 | 64.0 | 65.0 | 75.1 |
| 450 | 45.0 | 50.5 | 70.5 |
| 500 | 38.3 | 40.4 | 60.1 |
| 550 | 35.4 | 30.0 | 50.4 |

As is clear from Table 2, the exhaust gas cleaners of Examples 1 and 2 showed high removal ratios of the nitrogen oxides in a low temperature range of the exhaust gas. On the other hand, the exhaust gas cleaner of Comparative Example 1 which includes only the Ag component showed a poor removal ratio of the nitrogen oxides in the temperature range lower than 350° C. as compared with those of Examples 1 and 2.

EXAMPLE 3

The same exhaust gas cleaner (Ag/Pd/Mo) as prepared in Example 1 was evaluated on its removal efficiency. The test was conducted by passing the test gas having the composition shown in Table 3 at a rate of 4.4 liters per minute (the normal state), which corresponded to an overall apparent space velocity of 30,000 h⁻¹, at respective exhaust gas temperatures shown in Table 4.

TABLE 3

| Component | Concentration |
|---|---|
| Nitrogen monoxide | 800 ppm (dry basis) |
| Carbon dioxide | 100 ppm (dry basis) |
| Oxygen | 10 volume % (dry basis) |

TABLE 3-continued

| Propylene | 1714 ppm (dry basis, three times the weight of nitrogen monoxide) |
|---|---|
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured in the same manner as in Example 1. Further, the concentrations of carbon monoxide and hydrocarbons were measured by a CO-meter and HC-meter to determine the removal ratio of carbon monoxide and hydrocarbons. The results are shown in Table 4.

EXAMPLE 4

The same exhaust gas cleaner as prepared in Example 2 was evaluated on its removal efficiency in the same manner as in Example 3. The results are shown in Table 4.

COMPARATIVE EXAMPLE 2

The same exhaust gas cleaner as in Comparative Example 1 was subjected to the same test as in Example 3. The results are shown in Table 4.

TABLE 4

| Removal Ratios of Nitrogen Oxides (NOx), Carbon Monoxide (CO) and Hydrocarbons (HC) | | | | |
|---|---|---|---|---|
| Temperature | Removed | Removal Ratio (%) | | |
| (°C.) | Components | Ex. 3 | Ex. 4 | Com. Ex. 2 |
| 300 | NOx | 0 | 5 | 0 |
| | CO | 50 | 51 | 40 |
| | HC | 34.1 | 34.2 | 30 |
| 350 | NOx | 10 | 15 | 0 |
| | CO | 70.5 | 75 | 60 |
| | HC | 49.5 | 51 | 35 |
| 400 | NOx | 30 | 35 | 20 |
| | CO | 100 | 100 | 70 |
| | HC | 98 | 99 | 40 |
| 450 | NOx | 65 | 70 | 60 |
| | CO | 100 | 100 | 70 |
| | HC | 100 | 100 | 65 |
| 500 | NOx | 55 | 60 | 55 |
| | CO | 100 | 100 | 80 |
| | HC | 100 | 100 | 70 |
| 550 | NOx | 35 | 35 | 25 |
| | CO | 100 | 100 | 90 |
| | HC | 100 | 100 | 85 |
| 600 | NOx | 20 | 25 | 10 |
| | CO | 100 | 100 | 98 |
| | HC | 100 | 100 | 90 |

As is clear from Table 4, the exhaust gas cleaners of Examples 3 and 4 showed high removal ratios of nitrogen oxides, carbon monoxide and hydrocarbons in a wide temperature range of the exhaust gas. On the other hand, the exhaust gas cleaner of Comparative Example 2 which included the Ag component alone was effective for removal of nitrogen oxides in only a narrow temperature range of the exhaust gas, and showed poor removal ratios of carbon monoxide and hydrocarbons.

EXAMPLE 5

1.5 g of commercially available silica-alumina powder ($SiO_2$ content: 5 weight %, specific surface area: 350 $m^2$/g) was successively dispersed in an aqueous solution of silver nitrate and an aqueous solution of chloroplatinic acid to carry 5 weight % of Ag and 0.01 weight % of Pt based on the silica-alumina powder. The resultant powder was then dried and heated to 600° C. stepwise in air to be calcined. The powder thus obtained was further dispersed in an aqueous solution prepared by heating a mixture of ammonium molybdate, oxalic acid and water to carry 0.06 weight % of Mo. The powder thus treated was dried and calcined in the same manner as above and formed into granules of 0.5–1 mm diameter to obtain a catalyst (Ag/Pt/Mo).

An exhaust gas cleaner was prepared by charging into a reactor pipe 1.5 g of the catalyst. Next, a test gas having the composition shown in Table 5 was caused to pass through the reactor pipe at a rate of 1.8 liters per minute (the normal state), which corresponded to an overall apparent space velocity of about 34,000 $h^{-1}$ and a contact time of about 0.05 g·sec/ml. The temperature of the test gas in the reactor pipe was maintained at a temperature shown in FIG. 1 to cause a reaction of nitrogen oxides with ethanol.

TABLE 5

| Component | Concentration |
| --- | --- |
| Nitrogen monoxide | 800 ppm (dry basis) |
| Oxygen | 10 volume % (dry basis) |
| Ethanol | three times the weight of nitrogen monoxide (dry baisis) |
| Sulfur dioxide | 80 ppm (dry basis) |
| Nitrogen | Balance |
| Water | 10 volume % of the total volume of the above components |

The NOx removal ratios were determined in the same manner as in Example 1. The results are shown in FIG. 1.

EXAMPLE 6

The exhaust gas cleaner (Ag/Pt/Mo) prepared in Example 5 was exposed to a test gas having the same composition as in Table 5 except for containing no ethanol at 450° C. for 100 hours. The test gas was caused to pass through the reactor pipe at a rate of 1.8 liters per minute (the normal state), which corresponded to a contact time of 0.05 g·sec/ml. After such exposure treatment, the removal efficiency of the exhaust gas cleaner was evaluated in the same manner as in Example 5. The results are shown in FIG. 1.

COMPARATIVE EXAMPLE 3

In the same manner as in Example 5, a catalyst comprising γ-alumina powder (specific surface area: 260 $m^2$/g) carrying 5 weight % of Ag was prepared. 1.5 g of this catalyst was charged in a reactor pipe to obtain an exhaust gas cleaner. After the same exposure treatment as in Example 6, the removal efficiency of the exhaust gas cleaner was evaluated in the same manner as in Example 5. The results are shown in FIG. 1.

COMPARATIVE EXAMPLE 4

In the same manner as in Example 5, a catalyst comprising silica-alumina powder ($SiO_2$ content: 60 weight %, specific surface area: 490 $m^2$/g) carrying 5 weight % of Ag was prepared. 1.5 g of this catalyst was charged in a reactor pipe to obtain an exhaust gas cleaner. Then, tests were conducted under the same conditions as in Example 5. The results are shown in FIG. 1.

As seen from FIG. 1, the exhaust gas cleaners of Examples 5 and 6 where a silica-alumina composite oxide was used as the porous inorganic oxide showed high NOx removal ratios. In particular, the results of Example 6 evidenced that the exhaust cleaner of the present invention had a good durability because it showed practically no decrease in removal efficiency even after being exposed to a gas containing sulfur dioxide. On the other hand, in Comparative Example 3 where the cleaner comprised alumina carrying Ag alone and Comparative Example 4 where the cleaner comprised silica-alumina composite oxide containing excess silica (low alumina content) carrying Ag alone, the NOx removal ratio was poor.

EXAMPLE 7

10 g of commercially available γ-alumina pellets (diameter: 1.5 mm, length: 2–3 mm, specific surface area: 260 $m^2$/g) were immersed in an aqueous solution prepared by heating a mixture of ammonium tungstate, oxalic acid and water to carry 0.5 weight % of W. The resultant pellets were dried and heated to 600° C. stepwise in air to be calcined. The pellets thus calcined were further immersed in an aqueous solution of silver nitrate and an aqueous solution of palladium chloride successively to carry 5 weight % of Ag and 0.01 weight % of Pd based on the γ-alumina pellets. The pellets thus treated were dried and calcined in the same manner as above to obtain a catalyst (Ag/Pd/W).

An exhaust gas cleaner prepared by charging into a reactor pipe 1.5 g of the catalyst was subjected to the same test as in Example 3. The results are shown in Table 6.

EXAMPLE 8

A catalyst (Ag/Pd/W) carrying 5 weight % of Ag, 0.01 weight % of Pd and 4.8 weight % of W was prepared in the same manner as in Example 7.

An exhaust gas cleaner prepared by charging into a reactor pipe 1.5 g of the catalyst was subjected to the same test as in Example 3. The results are shown in Table 6.

TABLE 6

Removal ratios of Nitrogen Oxides (NOx), Carbon Monoxide (CO) and Hydrocarbons (HC)

| Temperature (°C.) | Removed Components | Removal Ratio (%) Ex. 7 | Removal Ratio (%) Ex. 8 |
| --- | --- | --- | --- |
| 300 | NOx | 7 | 30.6 |
|  | CO | 50 | 55.2 |
|  | HC | 38 | 42.1 |
| 350 | NOx | 35 | 50.5 |
|  | CO | 72 | 79 |
|  | HC | 51 | 62.3 |
| 400 | NOx | 70.2 | 73.2 |
|  | CO | 80 | 85 |
|  | HC | 70 | 75 |
| 450 | NOx | 68 | 80 |
|  | CO | 85 | 90 |
|  | HC | 78 | 82 |
| 500 | NOx | 52.4 | 75 |
|  | CO | 92 | 95 |
|  | HC | 85 | 90.3 |
| 550 | NOx | 16.4 | 30 |
|  | CO | 100 | 100 |
|  | HC | 90 | 95 |

TABLE 6-continued

Removal ratios of Nitrogen Oxides (NOx), Carbon Monoxide (CO) and Hydrocarbons (HC)

| Temperature (°C.) | Removed Components | Removal Ratio (%) Ex. 7 | Ex. 8 |
|---|---|---|---|
| 600 | NOx | 7 | 19.8 |
|  | CO | 100 | 100 |
|  | HC | 100 | 100 |

As is clear from Table 6, the exhaust gas cleaners of Examples 7 and 8 showed high removal ratios of nitrogen oxides, carbon monoxide and hydrocarbons in a wide temperature range of the exhaust gas.

EXAMPLE 9

10 g of commercially available γ-alumina pellets (diameter: 1.5 mm, length: 2–3 mm, specific surface area: 260 m$^2$/g) were immersed in an aqueous solution of silver nitrate, and dried at 80° C. for 2 hours in air and 180° C. for 2 hours in dry nitrogen stream. After cooling to room temperature in dry nitrogen stream, the γ-alumina pellets thus obtained were then immersed in an aqueous solution of ammonium chloride (0.5 g ammonium chloride in 20 ml water) for 12 hours to convert the silver nitrate on the γ-alumina pellets into the silver chloride precipitate, thereby obtaining the γ-alumina pellets carrying 4 weight % of silver chloride. The resultant pellets were then immersed in an aqueous solution of palladium chloride to carry 0.01 weight % of Pd, dried and heated to 600° C. stepwise in air to be calcined. The pellets thus calcined were further immersed in an aqueous solution prepared by heating a mixture of ammonium molybdate, oxalic acid and water to carry 0.06 weight % of Mo. The pellets thus treated were dried and calcined in the same manner as above to obtain a catalyst (AgCl/Pd/Mo).

An exhaust gas cleaner prepared by charging into a reactor pipe 3.6 g of the catalyst was subjected to the same test as in Example 1. The result are shown in Table 7.

EXAMPLE 10

In the same manner as in Example 9, γ-alumina powder (specific surface area: 200 m$^2$/g) carrying 4 weight % of AgCl, 0.01 weight % of Pd and 0.06 weight % of Mo was prepared. Then, 1.0 g of the catalyst thus obtained was coated on a commercially available honeycomb-type cordierite filter (diameter: 30 mm, length: 12.5 mm, 400 cells/in$^2$), dried and then heated to 600° C. stepwise to be calcined to prepare an exhaust gas cleaner (AgCl/Pd/Mo).

The exhaust gas cleaner was then charged in a reactor pipe and subjected to the same test as in Example 1. The result are shown in Table 7.

COMPARATIVE EXAMPLE 5

The same exhaust gas cleaner as in Comparative Example 1 was subjected to the same test as in Example 1. The result are shown in Table 7.

TABLE 7

| | Removal Ratio of Nitrogen Oxides (%) | | |
|---|---|---|---|
| Temp. (°C.) | Ex. 9 | Ex. 10 | Com. Ex. 5 |
| 250 | 80.2 | 83.0 | 30.0 |
| 300 | 90.4 | 92.2 | 50.2 |
| 350 | 84.2 | 86.2 | 65.8 |
| 400 | 66.0 | 66.0 | 75.1 |
| 450 | 50.2 | 55.2 | 70.5 |
| 500 | 40.3 | 45.4 | 60.1 |
| 550 | 38.8 | 38.0 | 50.4 |

EXAMPLE 11

In the same manner as in Example 1, a first catalyst (Ag/Pd/Mo) comprising γ-alumina pellets carrying 4 weight % of Ag, 0.01 weight % of Pd and 0.06 weight % of Mo was prepared.

Separately, 2 g of γ-alumina pellets of the same type as in Example 1 were immersed in an aqueous solution of chloroplatinic acid to carry 0.2 weight % of Pt. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt).

An exhaust gas cleaner was obtained by charging into a reactor pipe 3 g of the first catalyst on the inlet side and 0.6 g of the second catalyst on the outlet side. Next, the same test as in Example 1 was conducted. The results are shown in Table 8.

EXAMPLE 12

In the same manner as in Example 2, a first cleaner part coated with a first catalyst (Ag/Pd/Mo) carrying 4 weight % of Ag, 0.01 weight % of Pd and 0.06 weight % of Mo was prepared.

Separately, γ-alumina powder of the same type as in Example 2 was dispersed in an aqueous solution of chloroplatinic acid to obtain a slurry of γ-alumina powder carrying 0.2 weight % of Pt. 0.25 g (dry basis) of the slurry thus obtained was coated on a commercially available honeycomb-type cordierite filter (diameter: 30 mm, length: 2.5 mm). The cordierite filter thus treated was then dried and calcined in the same manner as employed for preparing the second catalyst of Example 11 to prepare a second exhaust gas cleaner part coated with the second catalyst (Pt).

With the first cleaner part on the inlet side and the second cleaner part on the outlet side, the two cleaner parts were combined and charged in a reactor pipe to prepare an exhaust gas cleaner. Then, the same test as in Example 1 was conducted. The results are shown in Table 8.

COMPARATIVE EXAMPLE 6

The same exhaust gas cleaner as in Comparative Example 1 was subjected to the same test as in Example 1. The result are shown in Table 8.

TABLE 8

| Temp. (°C.) | Removal Ratio of Nitrogen Oxides (%) | | |
|---|---|---|---|
| | Ex. 11 | Ex. 12 | Com. Ex. 6 |
| 250 | 82.0 | 88.0 | 30.0 |
| 300 | 90.8 | 93.5 | 50.2 |
| 350 | 83.2 | 90.0 | 65.8 |
| 400 | 64.0 | 65.0 | 75.1 |
| 450 | 50.0 | 55.5 | 70.5 |
| 500 | 40.3 | 43.4 | 60.1 |
| 550 | 38.4 | 40.0 | 50.1 |

As is clear from Table 8, the exhaust gas cleaners of Examples 11 and 12 showed high removal ratios of the nitrogen oxides in a wide temperature range, particularly in a low temperature range of the exhaust gas as compared with the exhaust gas cleaner of Comparative Example 6 which included only the Ag component.

EXAMPLE 13

The same exhaust gas cleaner as in Example 11 was subjected to the same test as in Example 3. The results are shown in Table 9.

EXAMPLE 14

The same exhaust gas cleaner as in Example 12 was subjected to the same test as in Example 3. The results are shown in Table 9.

COMPARATIVE EXAMPLE 7

The same exhaust gas cleaner as in Comparative Example 1 was subjected to the same test as in Example 3. The results are shown in Table 9.

TABLE 9

| Temperature (°C.) | Removed Components | Removal Ratios of Nitrogen Oxides (NOx), Carbon Monoxide (CO) and Hydrocarbons (HC) | | |
|---|---|---|---|---|
| | | Removal Ratio (%) | | |
| | | Ex. 13 | Ex. 14 | Com. Ex. 7 |
| 300 | NOx | 0 | 5 | 0 |
| | CO | 54.2 | 55.8 | 40 |
| | HC | 35.8 | 36 | 30 |
| 350 | NOx | 12 | 17 | 0 |
| | CO | 80 | 85 | 60 |
| | HC | 50 | 51 | 35 |
| 400 | NOx | 30 | 35 | 20 |
| | CO | 90 | 91 | 70 |
| | HC | 70 | 72 | 40 |
| 450 | NOx | 65 | 70 | 60 |
| | CO | 98 | 98 | 70 |
| | HC | 70 | 72 | 65 |
| 500 | NOx | 60 | 65 | 55 |
| | CO | 100 | 100 | 80 |
| | HC | 90 | 90 | 70 |
| 550 | NOx | 38 | 40 | 25 |
| | CO | 100 | 100 | 90 |
| | HC | 100 | 100 | 85 |
| 600 | NOx | 20 | 25 | 10 |
| | CO | 100 | 100 | 98 |
| | HC | 100 | 100 | 90 |

As is clear from Table 9, the exhaust gas cleaners of Examples 13 and 14 showed high removal ratios of nitrogen oxides, carbon monoxide and hydrocarbons in a wide temperature range of the exhaust gas. On the other hand, the exhaust gas cleaner of Comparative Example 7 which included the Ag component alone was effective for removal of nitrogen oxides in only a narrow temperature range of the exhaust gas, and showed poor removal ratios of carbon monoxide and hydrocarbons.

EXAMPLE 15

A first catalyst (Ag/Pd/W) carrying 5 weight % of Ag, 0.01 weight % of Pd and 0.5 weight % of W was prepared in the same manner as in Example 7.

Separately, a second catalyst (Pt) carrying 0.2 weight % of Pt was prepared in the same manner as in Example 11.

An exhaust gas cleaner was obtained by charging into a reactor pipe 3 g of the first catalyst on the inlet side and 0.6 g of the second catalyst on the outlet side. Then, the same test as in Example 3 was conducted. The results are shown in Table 10.

EXAMPLE 16

A first catalyst (Ag/Pd/W) carrying 5 weight % of Ag, 0.01 weight % of Pd and 4.8 weight % of W was prepared in the same manner as in Example 7.

Separately, a second catalyst (Pt) carrying 0.2 weight % of Pt was prepared in the same manner as in Example 11.

An exhaust gas cleaner obtained in the same manner as in Example 15 was subjected to the same test as in Example 3. The results are shown in Table 10.

TABLE 10

| Temperature (°C.) | Removed Components | Removal Ratios of Nitrogen Oxides (NOx), Carbon Monoxide (CO) and Hydrocarbons (HC) | |
|---|---|---|---|
| | | Removal Ratio (%) | |
| | | Ex. 15 | Ex. 16 |
| 300 | NOx | 8 | 30.6 |
| | CO | 55.6 | 59 |
| | HC | 40.4 | 48 |
| 350 | NOx | 38.3 | 52 |
| | CO | 80.4 | 82.3 |
| | HC | 50.4 | 62.4 |
| 400 | NOx | 75 | 76.2 |
| | CO | 90 | 92.1 |
| | HC | 70.3 | 78.5 |
| 450 | NOx | 74.8 | 82.1 |
| | CO | 93 | 95.4 |
| | HC | 67.8 | 82.5 |
| 500 | NOx | 45.8 | 74 |
| | CO | 100 | 100 |
| | HC | 88.9 | 92.1 |
| 550 | NOx | 20 | 33.4 |
| | CO | 100 | 100 |
| | HC | 100 | 100 |
| 600 | NOx | 10.6 | 9.6 |
| | CO | 100 | 100 |
| | HC | 100 | 100 |

As is clear from Table 10, the exhaust gas cleaners of Examples 15 and 16 showed high removal ratios of nitrogen oxides, carbon monoxide and hydrocarbons in a wide temperature range of the exhaust gas.

EXAMPLE 17

In the same manner as in Example 9, a first catalyst (AgCl/Pd/Mo) comprising γ-alumina pellets carrying 4 weight % of AgCl, 0.01 weight % of Pd and 0.06 weight % of Mo was prepared.

Separately, a second catalyst (Pt) carrying 0.2 weight % of Pt was prepared in the same manner as in Example 11.

An exhaust gas cleaner was obtained by charging into a reactor pipe 3 g of the first catalyst on the inlet side and 0.6 g of the second catalyst on the outlet side. Next, the same test as in Example 1 was conducted. The results are shown in Table 11.

EXAMPLE 18

In the same manner as in Example 10, a first cleaner part coated with a first catalyst (AgCl/Pd/Mo) carrying 4 weight % of AgCl, 0.01 weight % of Pd and 0.06 weight % of Mo was prepared.

A second cleaner part coated with a second catalyst (Pt) carrying 0.2 weight % of Pt was prepared in the same manner as in Example 12.

With the first cleaner part on the inlet side and the second cleaner part on the outlet side, the two cleaner parts were combined and charged in a reactor pipe to prepare an exhaust gas cleaner. Then, the same test as in Example 1 was conducted. The results are shown in Table 11.

COMPARATIVE EXAMPLE 8

The same exhaust gas cleaner as in Comparative Example 1 was subjected to the same test as in Example 1. The result are shown in Table 11.

TABLE 11

| Temp. (°C.) | Removal Ratio of Nitrogen Oxides (%) | | |
|---|---|---|---|
| | Ex. 17 | Ex. 18 | Com. Ex. 8 |
| 250 | 80.2 | 84.3 | 30.0 |
| 300 | 88.3 | 91.5 | 50.2 |
| 350 | 84.1 | 89.6 | 65.8 |
| 400 | 66.3 | 73.5 | 75.1 |
| 450 | 54.0 | 64.3 | 70.5 |
| 500 | 45.3 | 52.3 | 60.1 |
| 550 | 42.1 | 45.4 | 50.4 |

EXAMPLE 19

10 g of commercially available silica-alumina powder ($SiO_2$ content: 5 weight %, specific surface area: 350 $m^2/g$) was dispersed in an aqueous solution of silver nitrate and an aqueous solution of chloroplatinic acid to carry 4 weight % of Ag and 0.01 weight % of Pt. The powder thus obtained was dried and heated to 600° C. stepwise in air to be calcined. The resultant powder was further dispersed for 30 minutes in an aqueous solution prepared by heating over a water bath a mixture of ammonium vanadate, oxalic acid and water to carry 0.6 weight % of V. The powder thus treated was made into pellet (diameter: 1.5 mm, length: 2–3 mm), dried and heated to 600° C. stepwise in air to obtain a first catalyst (Ag/Pt/V).

Separately, 2 g of titania pellets (diameter: 1.5 mm, length: 2–3 mm, specific surface area: 350 $m^2/g$) were immersed in an aqueous solution of chloroplatinic acid to carry 1 weight % of Pt, then further immersed for 30 minutes in an aqueous solution prepared by heating over a water bath a mixture of ammonium vanadate, oxalic acid and water to carry 3 weight % of V. The titania pellets thus treated were dried and calcined in the same manner as in Example 11 to prepare a second catalyst (Pt/V).

An exhaust gas cleaner was obtained by charging into a reactor pipe 3.6 g of the first catalyst on the inlet side and 1.2 g of the second catalyst on the outlet side. Next, a test gas having the composition shown in Table 12 was caused to pass through the reactor pipe at a rate of 4.4 liters per minute (the normal state), which corresponded to an apparent space velocity of about 30,000 $h^{-1}$ at the first catalyst and an apparent space velocity of about 100,000 $h^{-1}$ at the second catalyst. The temperature of the test gas in the reactor pipe was maintained at each temperature shown in Table 13 to cause a reaction of nitrogen oxides with ethanol.

TABLE 12

| Component | Concentration |
|---|---|
| Nitrogen monoxide | 800 ppm (dry basis) |
| Oxygen | 10 volume % (dry basis) |
| Carbon monoxide | 100 ppm (dry basis) |
| Ethanol | three times the weight of nitrogen monoxide (dry baisis) |
| Propylene | 100 ppm (dry basis) |
| Sulfur dioxide | 80 ppm (dry basis) |
| Nitrogen | Balance |
| Water | 10 volume % of the total volume of the above components |

The removal ratio of NOx, CO and HC were determined in the same manner as in Example 3. The oxidation ratio of sulfur dioxide was determined by using an SOx-meter. However, the removal ratios of carbon monoxide and hydrocarbon were determined on the test gas containing no ethanol. The results are shown in Table 13.

EXAMPLE 20

In the same manner as in Example 19, silica-alumina powder carrying 4 weight % of Ag, 0.01 weight % of Pt and 0.6 weight % of V was prepared. Then, 1.0 g of the silica-alumina powder thus obtained was coated on a commercially available honeycomb-type cordierite filter (diameter: 30 mm, length: 12.5 mm, 400 cells/$in^2$), dried and then heated to 600° C. stepwise to calcine the coated filter to prepare a first exhaust gas cleaner part coated with the first catalyst (Ag/Pt/V).

Separately, titania powder (specific surface area: 50 $m^2/g$) was dispersed in an aqueous solution of chloroplatinic acid to carry 1 weight % of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % of W. 0.4 g (dry basis) of the slurry thus obtained was coated on a commercially available honeycomb-type cordierite filter (diameter: 30 mm, length: 4.2 mm). The cordierite filter thus coated was then dried and calcined in the same manner as in Example 19 to prepare a second exhaust gas cleaner part coated with the second catalyst (Pt/W).

With the first cleaner part on the inlet side and the second cleaner part on the outlet side, the two cleaner parts were combined and charged in a reactor pipe. Then, the same test as in Example 19 was conducted (apparent space velocity at the first catalyst: about 30,000 $h^{-1}$, apparent space velocity at the second catalyst: about 90,000 $h^{-1}$). The results are shown in Table 13.

EXAMPLE 21

In the same manner as in Example 20, a first cleaner part coated with a first catalyst (Ag/Pt/V) carrying 4 weight % of Ag, 0.01 weight % of Pt and 0.6 weight % of V was prepared.

Further, in the same manner as in Example 20, a second cleaner part coated with a second catalyst (Pt/W/V) carrying 1 weight % of Pt, 2 weight % of W and 1 weight % of V was prepared.

An exhaust gas cleaner prepared in the same manner as in Example 20 was subjected to the same test as in Example 19 (apparent space velocity at the first catalyst: about 30,000 h$^{-1}$, apparent space velocity at the second catalyst: about 90,000 h$^{-1}$). The results are shown in Table 13.

EXAMPLE 22

A first cleaner part coated with a first catalyst (Ag/Pt/V) carrying 4 weight % of Ag, 0.01 weight % of Pt and 0.6 weight % of V was prepared in the same manner as in Example 20 except for using a commercially available alumina powder (specific surface area: 200 m$^2$/g) in place of silica-alumina powder.

Further, in the same manner as in Example 20, a second cleaner part coated with a second catalyst (Pt/W) carrying 1 weight % of Pt and 3 weight % of W was prepared.

An exhaust gas cleaner prepared in the same manner as in Example 20 was subjected to the same test as in Example 19 (apparent space velocity at the first catalyst: about 30,000 h$^{-1}$, apparent space velocity at the second catalyst: about 90,000 h$^{-1}$). The results are shown in Table 13.

COMPARATIVE EXAMPLE 9

The same exhaust gas cleaner as in Comparative Example 1 was subjected to the same test as in Example 19. The result are shown in Table 13.

TABLE 13

Removal Ratios of Nitrogen Oxides (NOx), Carbon Monoxide (CO) and Hydrocarbons (HC), and Oxidation Ratio of Sulfur Dioxide (SO$_2$)

| Temperature (°C.) | Removed Components | Ex. 19 | Ex. 20 | Ex. 21 | Ex. 22 | Com. Ex. 9 |
|---|---|---|---|---|---|---|
| 250 | NOx | 32 | 30 | 35 | 35 | 12 |
|  | CO | 82 | 77 | 72 | 78 | 15 |
|  | HC | 52 | 48 | 52 | 49 | 10 |
|  | SO$_2$ | — | — | — | — | — |
| 300 | NOx | 60 | 55 | 63 | 58 | 30 |
|  | CO | 92 | 91 | 90 | 93 | 40 |
|  | HC | 67 | 67 | 70 | 68 | 32 |
|  | SO$_2$ | — | — | — | — | — |
| 350 | NOx | 82 | 75 | 85 | 78 | 50 |
|  | CO | 98 | 96 | 96 | 98 | 60 |
|  | HC | 72 | 72 | 72 | 75 | 32 |
|  | SO$_2$ | — | — | — | — | — |
| 400 | NOx | 80 | 78 | 78 | 80 | 60 |
|  | CO | 100 | 100 | 100 | 100 | 70 |
|  | HC | 95 | 95 | 95 | 96 | 40 |
|  | SO$_2$ | 5 | 5 | 5 | 5 | — |
| 450 | NOx | 68 | 68 | 65 | 65 | 70 |
|  | CO | 100 | 100 | 100 | 100 | 70 |
|  | HC | 98 | 98 | 96 | 99 | 65 |
|  | SO$_2$ | 7 | 7 | 7 | 7.2 | — |
| 500 | NOx | 52 | 53 | 50 | 50 | 60 |
|  | CO | 100 | 100 | 100 | 100 | 80 |
|  | HC | 100 | 100 | 100 | 100 | 70 |
|  | SO$_2$ | 12 | 12 | 12 | 12.5 | — |
| 550 | NOx | 30 | 30 | 30 | 25 | 52 |
|  | CO | 100 | 100 | 100 | 100 | 90 |
|  | HC | 100 | 100 | 100 | 100 | 85 |
|  | SO$_2$ | 15 | 15 | 15 | 16 | — |
| 600 | NOx | 10 | 10 | 10 | 8 | 20 |
|  | CO | 100 | 100 | 100 | 100 | 98 |
|  | HC | 100 | 100 | 100 | 100 | 90 |
|  | SO$_2$ | 20 | 20 | 20 | 21 | — |

As seen from Table 13, the exhaust gas cleaners of Examples 9–22 showed high removal ratio of the nitrogen oxides in a wide temperature range as well as high removal ratios of carbon monoxide and hydrocarbons even in a lower temperature range. In addition the use of alumina-based composite oxide prevented SO$_2$ from being preferentially oxidized.

EXAMPLE 23

10 g of commercially available silica-alumina powder (SiO$_2$ content: 5 weight %, specific surface area: 350 m$^2$/g) was dispersed in an aqueous solution of silver nitrate, and dried at 80° C. for 2 hours in air and 180° C. for 2 hours in dry nitrogen stream. After cooling to room temperature in dry nitrogen stream, the silica-alumina powder thus obtained was then immersed in an aqueous solution of ammonium chloride (0.5 g ammonium chloride in 20 ml water) for 12 hours to convert the silver nitrate on the silica-alumina powder into the silver chloride precipitate, thereby obtaining the silica-alumina powder carrying 4 weight % of AgCl. The silica-alumina powder was then subjected to the same treatment as in Example 19 to obtain a first catalyst (AgCl/Pt/V) carrying 0.01 weight % of Pt and 0.6 weight % of V in the form of pellet.

Separately, a second catalyst (Pt/V) carrying 1 weight % of Pt and 3 weight % of V was prepared in the same manner as in Example 19.

An exhaust gas cleaner obtained by charging into a reactor pipe 3.6 g of the first catalyst on the inlet side and 1.2 g of the second catalyst on the outlet side was subjected to the same test as in Example 1. The results are shown in Table 14.

EXAMPLE 24

In the same manner as in Example 19, silica-alumina powder carrying 4 weight % of AgCl, 0.01 weight % of Pt and 0.6 weight % of V was prepared. Then, a first exhaust gas cleaner part coated with the first catalyst (AgCl/Pt/V) was prepared by using the silica-alumina powder thus obtained in the same manner as in Example 20.

Further, a second exhaust gas cleaner part coated with the second catalyst (Pt/W) carrying 1 weight % of Pt and 3 weight % of W was prepared in the same manner as in Example 20.

With the first cleaner part on the inlet side and the second cleaner part on the outlet side, the two cleaner parts were combined and charged in a reactor pipe. Then, the same test as in Example 1 was conducted. The results are shown in Table 14.

COMPARATIVE EXAMPLE 10

The same exhaust gas cleaner as in Comparative Example 1 was subjected to the same test as in Example 1. The result are shown in Table 14.

TABLE 14

| | Removal Ratio of Nitrogen Oxides (%) | | |
|---|---|---|---|
| Temp. (°C.) | Ex. 23 | Ex. 24 | Com. Ex. 10 |
| 250 | 82.1 | 83.5 | 30.0 |
| 300 | 88.8 | 89.8 | 50.2 |
| 350 | 84.2 | 86.3 | 65.8 |
| 400 | 65.0 | 68.3 | 75.1 |
| 450 | 50.3 | 54.2 | 70.5 |
| 500 | 42.5 | 48.3 | 60.1 |
| 550 | 40.3 | 45.6 | 50.4 |

What is claimed is:

1. A method for removing nitrogen oxides by reduction, and unburned components of carbon monoxide and hydrocarbons by oxidation, from an exhaust gas containing nitrogen oxides and oxygen in an amount larger than the stoichiometric amount of said oxygen relative to said unburned components in said exhaust gas, which comprises:

disposing an exhaust gas cleaner in a flow path of said exhaust gas, said exhaust gas cleaner consisting essentially of a first catalyst consisting essentially of a first porous inorganic oxide supporting 0.2–15 weight % of an Ag component, 0.01–10 weight % of a W component and 0.001–1 weight % of a Pt component, said weight percentages being expressed by metal basis, said Ag component being at least one selected from the group consisting of Ag and compounds thereof, said Pt component being at least one selected from the group consisting of Pt, Pd, Ru, Rh, and Ir, and said W component being at least one selected from the group consisting of W, V, Mn, Mo, Nb and Ta;

introducing into said exhaust gas upstream of said exhaust gas cleaner (1) at least one reducing agent selected from the group consisting of hydrocarbons and oxygen-containing organic compounds having at least two carbon atoms or (2) a fuel containing said at least one reducing agent; and bringing the resulting exhaust gas containing said reducing agent into contact with said exhaust gas cleaner at 150°–650° C., thereby causing a reaction of said nitrogen oxides with said reducing agent to remove said nitrogen oxides by reduction and unburned components of carbon monoxide and hydrocarbons by oxidation from said exhaust gas.

2. The method according to claim 1, wherein said exhaust gas cleaner has a second catalyst disposed downstream from said first catalyst, said second catalyst consisting essentially of a second porous inorganic oxide supporting 0.01–5 weight % of a Pt component selected from the group consisting of Pt, Pd, Ru, Rh, Ir, Au and mixtures thereof.

3. The method according to claim 1, wherein said exhaust gas cleaner has a second catalyst disposed downstream from said first catalyst, said second catalyst consisting essentially of a second porous inorganic oxide supporting 0.01–5 weight % of a Pt component selected from the group consisting of Pt, Pd, Ru, Rh, Ir, Au and mixtures thereof, and 0.01–10 weight % of a W component selected from the group consisting of W, V, Mn, Mo, Nb, Ta, and mixtures thereof.

\* \* \* \* \*